(12) United States Patent
Balaji et al.

(10) Patent No.: US 12,119,947 B2
(45) Date of Patent: Oct. 15, 2024

(54) METHODS AND SYSTEMS FOR GENERATING ARCHIVAL DATA FROM VIRTUAL MEETINGS

(71) Applicant: Zoom Video Communications, Inc., San Jose, CA (US)

(72) Inventors: Abhishek Balaji, San Jose, CA (US); Adi Regev, Fair Lawn, NJ (US)

(73) Assignee: Zoom Video Communications, Inc., San Jose, CA (US)

( * ) Notice: Subject to any disclaimer, the term of this patent is extended or adjusted under 35 U.S.C. 154(b) by 651 days.

(21) Appl. No.: 17/332,993

(22) Filed: May 27, 2021

(65) Prior Publication Data

US 2022/0385494 A1 Dec. 1, 2022

(51) Int. Cl.
*H04L 12/18* (2006.01)
*H04L 9/40* (2022.01)

(52) U.S. Cl.
CPC ...... *H04L 12/1831* (2013.01); *H04L 12/1822* (2013.01); *H04L 63/101* (2013.01); *H04L 63/102* (2013.01)

(58) Field of Classification Search
CPC ............. H04L 12/1831; H04L 12/1822; H04L 63/101; H04L 63/102
See application file for complete search history.

(56) References Cited

U.S. PATENT DOCUMENTS

| | | | | |
|---|---|---|---|---|
| 10,015,169 B2 * | 7/2018 | Kennedy | ................. | G06F 21/55 |
| 10,972,413 B2 * | 4/2021 | Pamidiparthi | ........ | H04L 51/214 |
| 11,061,991 B2 * | 7/2021 | Murphy | ................... | H04L 67/02 |
| 11,087,019 B2 * | 8/2021 | Levy | ....................... | H04L 63/20 |
| 11,720,707 B2 * | 8/2023 | Levy | ................... | H04L 12/1831 726/1 |
| 2005/0113025 A1 * | 5/2005 | Akamatsu | .......... | H04N 1/00408 455/41.3 |
| 2010/0106923 A1 * | 4/2010 | Backa | .................... | G06F 16/113 711/E12.001 |
| 2013/0090973 A1 * | 4/2013 | Hui | ...................... | G06Q 10/109 705/1.1 |
| 2016/0070812 A1 * | 3/2016 | Murphy | .............. | G06F 21/6218 707/608 |
| 2017/0208105 A1 * | 7/2017 | Katekar | .............. | H04L 12/1827 |
| 2017/0359551 A1 * | 12/2017 | Shaw | ..................... | H04N 7/152 |
| 2020/0057866 A1 * | 2/2020 | Levy | ................... | G06F 21/6245 |

(Continued)

OTHER PUBLICATIONS

U.S. Appl. No. 17/877,892, "Non-Final Office Action", Dec. 21, 2023, 21 pages.

*Primary Examiner* — Todd L Barker
(74) *Attorney, Agent, or Firm* — Kilpatrick Townsend & Stockton LLP (57) ABSTRACT

Various embodiments of an apparatus, method(s), system(s) and computer program product(s) described herein are directed to an Archiving Engine that detects a regulated user account(s) joining a virtual meeting and instantiating a virtual meeting participant instance to capturing one or more communication channels of the virtual meeting hosted by a communication system. The Archiving Engine generates an archival file(s) based on the captured communication channel data. The Archiving Engine generates one or more translated files by applying a compliance policy associated with at least one of the regulated user accounts to the one or more archival files.

19 Claims, 8 Drawing Sheets

(56) References Cited

U.S. PATENT DOCUMENTS

| | | | | |
|---|---|---|---|---|
| 2020/0204509 A1* | 6/2020 | Pamidiparthi | ......... | G06Q 10/10 |
| 2021/0334405 A1* | 10/2021 | Levy | ....................... | H04L 67/14 |
| 2022/0385758 A1 | 12/2022 | Tadesse et al. | | |
| 2023/0334173 A1* | 10/2023 | Levy | .................. | G06F 21/6245 |

* cited by examiner

METHODS AND SYSTEMS FOR GENERATING ARCHIVAL DATA FROM VIRTUAL MEETINGS

FIELD OF INVENTION

Various embodiments relate generally to digital communication, and more particularly, to systems and methods applying and managing compliance policies with regard to virtual meetings hosted by a communication or messaging platform.

BACKGROUND

Digital communication tools and platforms have been essential in providing the ability for people and organizations to communicate and collaborate remotely, e.g., over the internet. Applications for casual friendly conversation ("chat"), work meetings or gatherings, asynchronous work or personal conversation, and more have exploded in popularity. Many allow for participants to enter a conversation using any of a wide variety of devices and allow for switching between different devices in the middle of a conversation. It has also become common for such applications to allow for documents and media (such as images, video, or audio) to be uploaded to a server, where they can then be transmitted to other chat participants.

Digital communication tools and platforms provide applications for hosting video conference calls dedicated to a particular meeting room. Such video conference calls may be accessed by remote attendees via their communication platform user accounts. Multiple attendees may physically be present in the particular meeting room and view a video stream presented in the particular meeting room. The same video stream may be concurrently sent to the respective computing devices of the user accounts that remotely access the video conference call.

Recent digital communication tools and platforms are driven by cloud-based peer-to-peer software which allow users to access teleconferences and online chat services from their mobile computer devices. Individuals with user accounts on the cloud-based software communication platform are able download a client application onto their mobile computer devices and can log onto the cloud-based platform via the client application using their user account credentials.

In many cases, the user may be provided with a digital event notification that includes a link for accessing a scheduled digital event, such as a virtual meeting. The digital event may be created by a host user account. Additional user accounts that have received the digital event notification are defined as guests who have been given permission by the host user account to attend (i.e. log onto and access) the digital event.

Host and guest user accounts are provided a variety of tools and functionalities while they are logged onto a virtual meeting. The host user account may have access to record the virtual meeting and provide guest user accounts with permission to record the virtual meeting. The host and guest user accounts may be able to concurrently send chat messages during the virtual meeting. Some chat messages may be sent to all the user accounts logged onto the virtual meeting. A user account may select specific user accounts logged onto the virtual meeting who are the intended recipients of certain chat messages.

Various collaborative tools and functionalities are also available to user accounts while logged into a virtual meeting. For example, guest user account can share a view of the current content displayed on the computer device they used to log into the virtual meeting. A digital whiteboard may be available for collaborative work between the user accounts. Various user accounts logged into the virtual meeting may concurrently modify and enter input to be displayed on the digital whiteboard such that all user accounts in the virtual meeting can view the digital whiteboard as it is updated and edited.

As the field of digital communication tools and platforms matures, new tools and functionalities continue to be developed. New use cases and end user scenarios emerge as a result of accelerated user adoption and different types of digital events reveal gaps in the tools and functionalities currently available.

SUMMARY

Conventional systems are deficient with respect to properly managing the storage, archiving and data retrieval requirements of compliance policies that identify varying types of data that are to be archived for different user accounts. In particular, conventional systems are challenged when multiple regulated user accounts, associated with different compliance policies, have generated data with respect to the same event, such when multiple regulated user accounts attend the same virtual meeting and each regulated user account is subject to data archival requirements according to different compliance policies.

In addition, external organizations often engage with $3^{rd}$ party vendors to oversee and manage their data archival programs with respect to their regulated user accounts. Conventional systems are further deficient in properly integrating the dataflow between multiple different $3^{rd}$ party vendors attempting to retrieve and archive different types of data from the same virtual meeting without altering or corrupting the base data files that reflect the true record of the virtual meeting. In various embodiments, an external organization may be performing and managing its own data archival program without the need for partnering with a vendor.

Various embodiments of the Archiving Engine described herein provide improvements to conventional systems by allowing for the identification, storage and archiving of compliance data required by differing compliance policies associated with multiple regulated user accounts that joined the same virtual meeting. Such improvements include, for example, providing access to different archived compliance data for multiple regulated user accounts from the same archival files of the virtual meeting without permanently modifying the original archival files as well as generating metadata on a per-user account basis that specifies compliance events in the archival files identified as important by the corresponding compliance policy.

Various embodiments of an apparatus, method(s), system(s) and computer program product(s) described herein are directed to an Archiving Engine that detect one or more regulated user accounts joining a virtual meeting. The Archiving Engine instantiates a virtual meeting participant instance based on detection of the one or more regulated user accounts joining the virtual meeting and capturing, via the virtual meeting participant instance in the virtual meeting, one or more communication channels of the virtual meeting. The Archiving Engine starts such communication channel capture starting from an earliest entry time of a regulated user account that is a first regulated user account to join the virtual meeting. The Archiving Engine generates one or more archival files based on the capture by the virtual meeting participant instance. The Archiving Engine generates one or more translated files by applying a compliance policy associated with at least one of the regulated user accounts to the one or more archival files.

In one or more embodiments, a regulated user account may be a user account identified in a compliance policy. A compliance policy defines various types of data related to the regulated user account's attendance in a virtual meeting that is to be saved and archived for future reference and/or data compliance purposes. A virtual meeting may have multiple participants that are regulated user accounts from the same external organization, where each regulated user account may be associated with a different compliance policy that identifies different types of data from different points of time in the virtual meeting that need to be archived.

In some embodiments, the Archiving Engine generates a bot program ("bot") and executes the bot program as an invisible virtual meeting participant that captures video and chat data during a virtual meeting. The bot initiates capture of the voice, video and chat data when the first regulated user account to join the virtual meeting. In some embodiments the first regulated user account may join the virtual meeting after the virtual meeting has already started. The bot terminates capture of the voice, video and chat data when the virtual meeting ends, even if all regulated user accounts that joined the virtual meeting have already logged off of the virtual meeting prior to the virtual meetings end.

According to various embodiments, the Archiving Engine stores voice and video files and captured chat data and meeting transcription. The Archiving Engine applies a compliance policy that corresponds to a regulated user account that joined the virtual meeting against a copy of the first archival file and/or the second archival file.

In various embodiments, the Archiving Engine disables a virtual meeting upon detecting that a regulated user account has joined the virtual meeting and is associated with a compliance policy that requires capture of data from a communications channel(s) of the virtual meeting that is currently unavailable.

Various embodiments include a module(s) and/or one or more functionalities to redact privacy information/data, to encrypt information/data and to anonymize data to ensure the confidentiality and security of user and platform information/data as well as compliance with data privacy law(s) and regulations in the United States and/or international jurisdictions.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the invention. The invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

I. Exemplary Environments

Figure 1A:
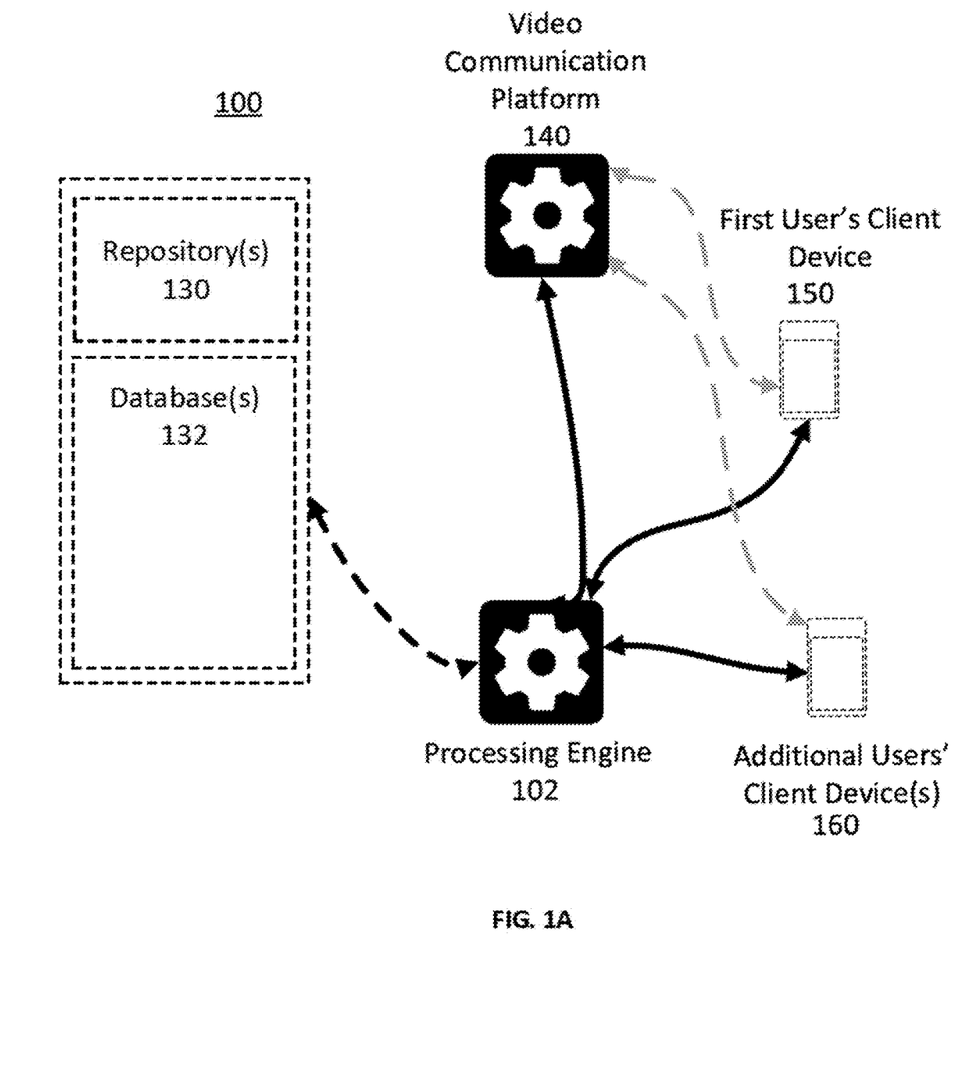
FIG. 1A is a diagram illustrating an exemplary environment in which some embodiments may operate.

FIG. 1A is a diagram illustrating an exemplary environment in which some embodiments may operate. In the exemplary environment 100, a sending client device 150, one or more receiving client device(s) 160 are connected to a processing engine 102 and, optionally, a communication platform 140. The processing engine 102 is connected to the communication platform 140, and optionally connected to one or more repositories 130 and/or databases 132 for managing meeting archival agent data/operations and meeting archiving translator data/operations. One or more of the databases may be combined or split into multiple databases. The sending client device 150 and receiving client device(s) 160 in this environment may be computers, and the communication platform server 140 and processing engine 102 may be applications or software hosted on a computer or multiple computers which are communicatively coupled via remote server or locally.

The exemplary environment 100 is illustrated with only one sending client device, one receiving client device, one processing engine, and one communication platform, though in practice there may be more or fewer sending client devices, receiving client devices, processing engines, and/or communication platforms. In some embodiments, the sending client device, receiving client device, processing engine, and/or communication platform may be part of the same computer or device.

In an embodiment, the processing engine 102 may perform the method 400 (FIG. 4) or any other method herein and, as a result, may archive and translate virtual meeting data as described herein In some embodiments, this may be accomplished via communication with the sending client device, receiving client device(s), processing engine 102, communication platform 140, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

Sending client device 150 and receiving client device(s) 160 are devices with a display configured to present information to a user of the device. In some embodiments, the sending client device 150 and receiving client device(s) 160 present information in the form of a user interface (UI) with UI elements or components. In some embodiments, the sending client device 150 and receiving client device(s) 160 send and receive signals and/or information to the processing engine 102 and/or communication platform 140. The sending client device 150 is configured to submit messages (i.e., chat messages, content, files, documents, media, or other forms of information or data) to one or more receiving client device(s) 160. The receiving client device(s) 160 are configured to provide access to such messages to permitted users within an expiration time window. In some embodiments, sending client device 150 and receiving client device(s) are computer devices capable of hosting and executing one or more applications or other programs capable of sending and/or receiving information. In some embodiments, the sending client device 150 and/or receiving client device(s) 160 may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the sending client device 150 and/or receiving client device(s) 160. In some embodiments, one or more of the communication platform 140, processing engine 102, and sending client device 150 or receiving client device 160 may be the same device. In some embodiments, the sending client device 150 is associated with a sending user account, and the receiving client device(s) 160 are associated with receiving user account(s).

In some embodiments, optional repositories function to store and/or maintain, respectively, user account information associated with the communication platform 140, conversations between two or more user accounts of the communication platform 140, and sensitive messages (which may include sensitive documents, media, or files) which are contained via the processing engine 102. The optional repositories may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate communication between two or more parties, such as within a conversation, "chat" (i.e., a chat room or series of public or private chat messages), video conference or meeting, message board or forum, virtual meeting, or other form of digital communication.

Figure 1B:
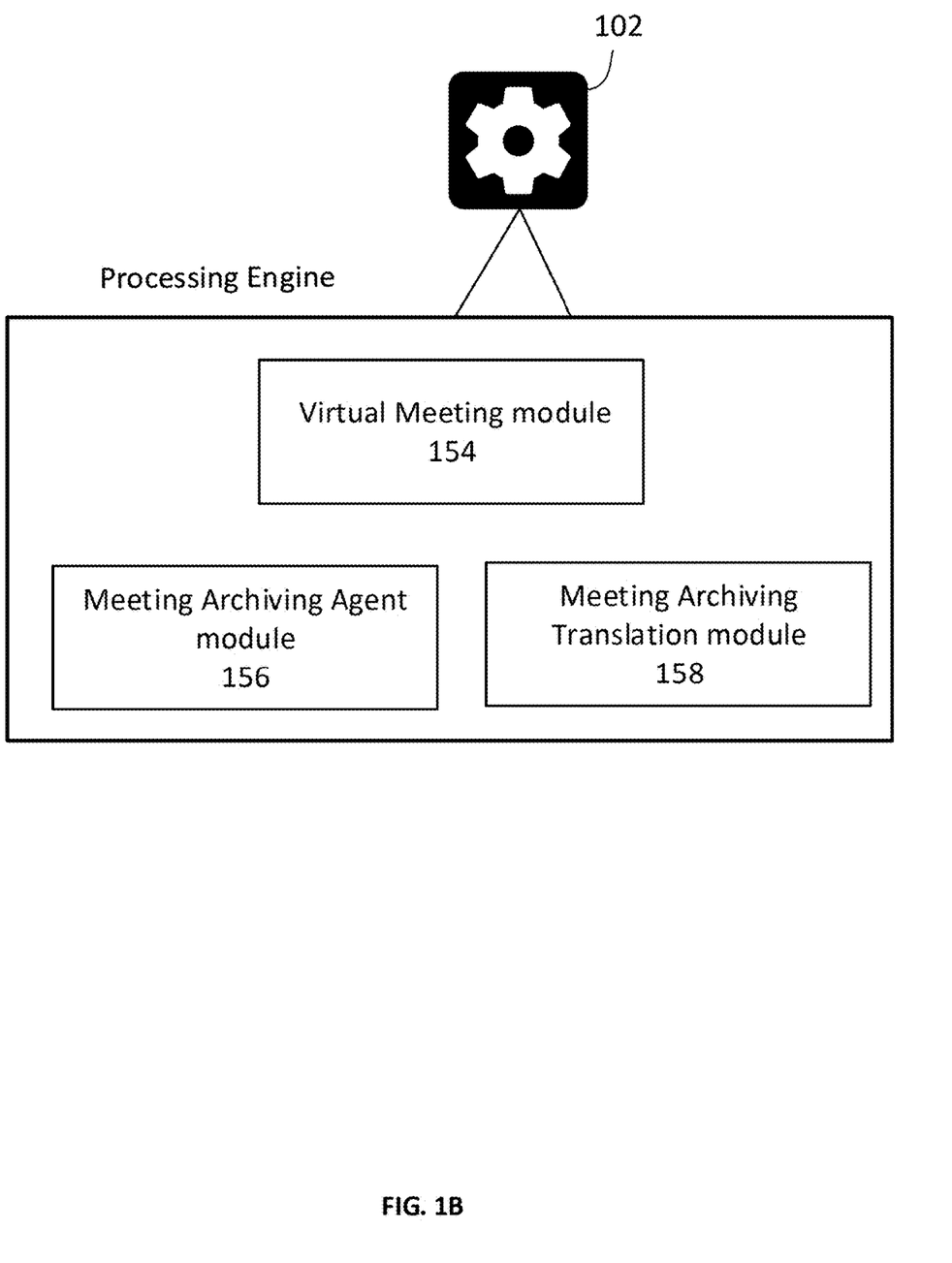
FIG. 1B is a diagram illustrating an exemplary environment in which some embodiments may operate.

FIG. 1B is a diagram illustrating exemplary software modules 154, 156, 158 that may execute some or all of the functionality described herein. According to some embodiments, one or more of exemplary software modules 154, 156, 158 may be part of the processing engine 102. In some embodiments, one or more of the exemplary software modules 154, 156, 158 may be distributed throughout the communication platform 140.

Virtual Meeting module 154 functions to define, support, execute, and/or implement any of the functionalities, acts and/or operations described herein with regard to detecting one or more events of a virtual meeting(s) and/or processing data related to a virtual meeting joined by a regulated user account(s) or hosted by a regulated user account.

Meeting Archiving Agent module 156 functions to define, support, execute, and/or implement any of the functionalities, acts and/or operations described herein with regard to a meeting archiving agent, multimedia recorder and/or a virtual meeting participant bot program.

Meeting Archiving Translation module 158 functions to define, support, execute, and/or implement any of the functionalities, acts and/or operations described herein with regard to the meeting archiving translator, a translated archival file(s), a link(s) for retrieval of a translated archival file and/or metadata related to a translated archival file.

The above modules 154, 156, 158 and their functions will be described in further detail in relation to FIGS. 2-6.

Figure 2:
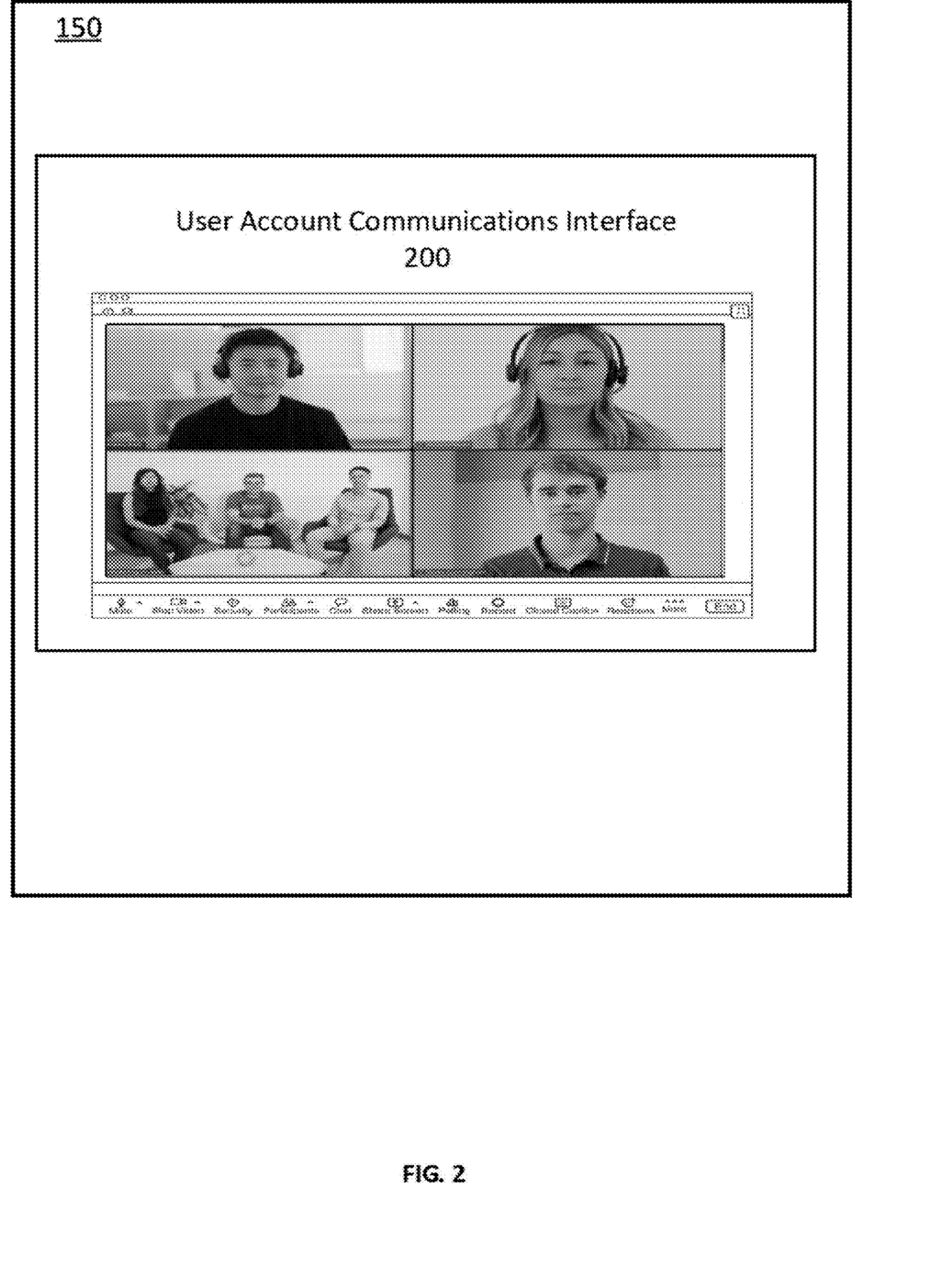
FIG. 2 is a diagram illustrating an exemplary environment in which some embodiments may operate.

As shown in FIG. 2, user account communications interface 200 for accessing and communicating with the platform 140 may be executed and displayed at a computer device 150. The interface 206 provides access to video data, audio data, chat data and meeting transcription related to a virtual meeting joined by a user account associated with the computer device 150. The interface 206 further provides various types of tools, functionalities, and settings that can be selected by a user Count during a virtual meeting. Various types of virtual meeting control tools, functionalities, and settings are, for example, mute/unmute audio, turn on/off video, start meeting, join meeting, view and call contacts, send/read chat message and/or provide edits/inputs to a whiteboard functionality.

Figure 3:
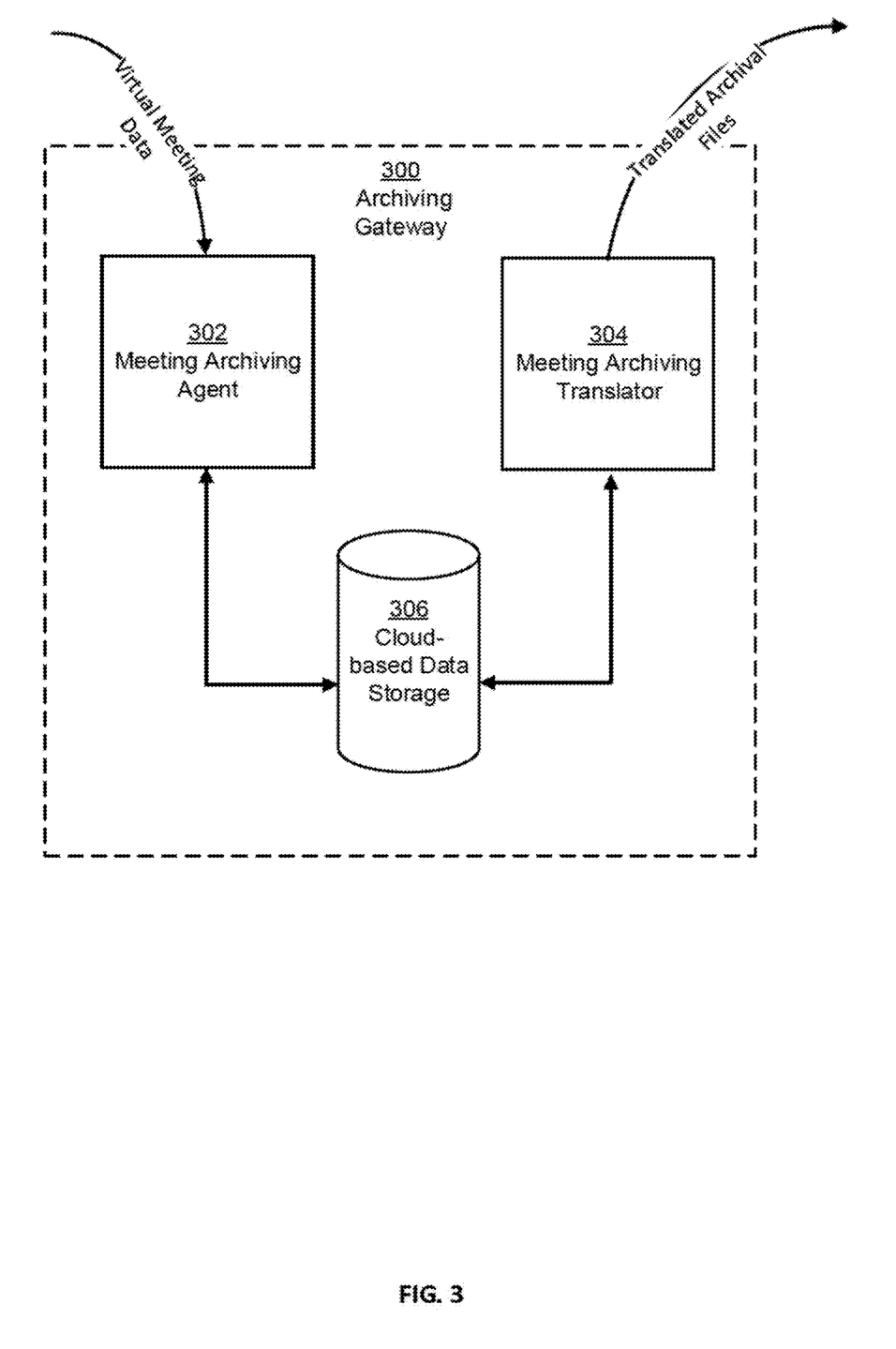
FIG. 3 is a diagram illustrating an exemplary environment in which some embodiments may operate.

As shown in FIG. 3, the Archiving Engine includes an archiving gateway 300 within a communication system (i.e. platform 140) with a meeting archiving agent 302 and a meeting archiving translator 304. According to various embodiments, a regulated user account that accesses virtual meetings on the platform may be associated with an external organization. The external organization may have various data compliance and data archival policies and requirements. The external organization may generate such policies in order to ensure that various types of data that reflect the activities of the user account are properly and timely captured. In addition, the external organization may partner with a third-party archival vendor system ("vendor") that manages and stores archival data captured per the external organizations policies. In some embodiments, the external organization may be managing its own data archiving program and may be acting as a "vendor" as described herein.

The vendor may develop an application for deployment within the platform 140. The application may be configured to be compatible and communicate with the Archiving Engine such that the vendor can receive translated files and translated file metadata that complies with the external organizations various policies. In some embodiments, the application may be deployed in an app marketplace associated with the platform 140.

In some embodiments, the Archiving Engine captures data from various types of communication channels of a virtual meeting currently accessed by a regulated user account. The Archiving Engine temporarily stores the raw captured data from the virtual meeting communication channels. In some embodiments, the Archiving Engine may implement a schedule to permanently delete the raw captured data from the platform 140 after translated files have been delivered to the vendor. Various types of data captured by the Archiving Engine may further include any of: a transcription, whiteboarding, user reactions, non-verbal feedback and annotations from the virtual meeting.

A data archiving policy from the external organization may have been previously uploaded to the platform 140. The Archiving Engine identifies the data archiving policy that matches the regulated user account. The Archiving Engine generates one or more translated files based on the raw captured data from the virtual meeting communication channels and places the translated files in a location accessible to the vendor. For example, the Archiving Engine may place the one or more translated files in a cloud-based storage location that is accessible to the vendor. In some embodiments, the cloud-based storage location may be a temporary cloud-based storage location.

In some embodiments, the application developed by the vendor and deployed within the platform 140 may include a subscription request for a web-hook. A web hook may be a subscription to receive notifications from the Archiving Engine when one or more translated files have been delivered to a storage location associated with the vendor. An API can also be used to retrieve this information. In addition to generating translated files, the Archiving Engine further generates metadata associated with the translated files. For example, the metadata may include a meeting identifier for the virtual meeting, a start time of the virtual meeting, a duration of the virtual meeting, a time zone of the virtual meeting, a list of various user accounts that joined the meeting, a link (i.e. uniform resource locator) that points to a storage location from which the vendor can download the translated files. Additional types of metadata may include various times in the virtual meeting when a regulated user account joined the virtual meeting and left the virtual meeting and a data type of the translated file. For example, various data types of translated files include: a video file, an audio file, a transcript file and a .csv file containing polling data from a poll of user accounts that occurred during the virtual meeting.

The vendor may utilize the web-hook or API to access the link in order to acquire the one or more translated files delivered by the Archiving Engine and to permanently store the translated files within the vendor's data storage and management system. In addition, the vendor may use any portion(s) of the metadata generated by the Archiving Engine in various requests sent back into the platform 140 via different APIs different APIs (application programing interfaces). Such requests may be requests for various types of data related to the virtual meeting generated by various modules within the platform 140 whereby the metadata generated by the Archiving Engine may be inserted into a respective request to properly identify such desired various types of data that the vendor seeks to further archive and store in association with the one or more translated files.

In various embodiments, the meeting archiving agent 302 receives virtual meeting data and stores the virtual meeting data in data storage 306. For example, the data storage 306 may be cloud-based data storage or cloud-based temporary data storage. The virtual meeting data stored in data storage 306 may be one or more archival files based on communication channels data from a virtual meeting attended by one or more regulated user accounts. For example, a first archival file stored in data storage 306 may include the recorded video stream of the virtual meeting. It is understood that the first archival file further includes voice data of the virtual meeting. A second archival file stored in data storage 306 may include recorded chat data from the virtual meeting.

The meeting archiving translator 304 applies a compliance policy associated with a regulated user account that joined the virtual meeting. In some embodiments, a first compliance policy associated with a first regulated user account requires voice data from the virtual meeting. In some embodiments, the meeting archiving translator 304 accesses the stored video stream in the first archival file and strips voice data out of the first archival file to generate a translated voice file. The meeting archiving translator 304 places the translated voice file in a customer storage location external to the communications system, such as a storage location associated with the vendor.

In some embodiments, a second compliance policy associated with a second regulated user account that joined the same virtual meeting requires only the chat data in the second archival file in the data storage 306. The meeting archiving translator 304 thereby places a translated file that includes the chat data in a customer storage location external to the communications system. It is understood that the first and second compliance policies may correspond the same external organizations.

Figure 4:
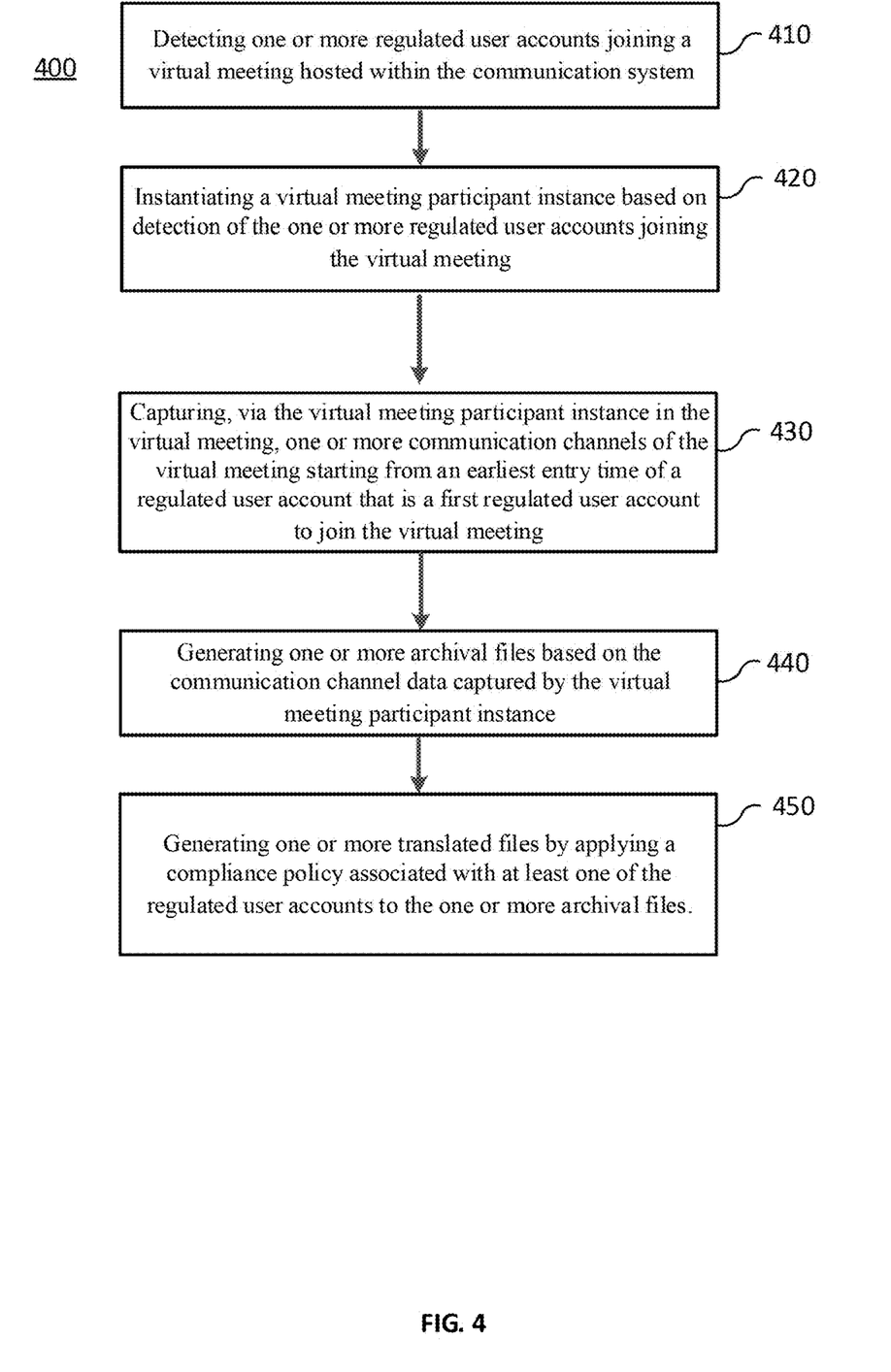
FIG. 4 is a diagram illustrating an exemplary method that may be performed in some embodiments.

As shown in flowchart 400 of FIG. 4, the Archiving Engine detects one or more regulated user accounts joining a virtual meeting hosted within the communication system (i.e. platform 140). (Act 410)

The Archiving Engine instantiates a virtual meeting participant instance based on detection of the one or more regulated user accounts joining the virtual meeting. (Act 420) The Archiving Engine captures, via the virtual meeting participant instance in the virtual meeting, one or more communication channels of the virtual meeting starting from an earliest entry time of a regulated user account that is a first regulated user account to join the virtual meeting. (Act 430)

According to various embodiments, the Archiving Engine instantiates a bot program to capture virtual meeting data only upon detection that a first regulated user account has joined a virtual meeting. For example, if the virtual meeting starts and a regulated user account joins 10 minutes later and that regulated user account is the first (i.e. initial) regulated user account to join the virtual meeting, then the Archiving Engine instantiates the bot program upon detection of that regulated user accounts access of the virtual meeting.

The Archiving Engine generates one or more archival files based on the communication channel data captured by the virtual meeting participant instance. (Act 440) For example, the Archiving Engine stores virtual meeting video data in a first archival file and virtual meeting chat data in a second archival file.

The Archiving Engine generates one or more translated files by applying a compliance policy associated with a regulated user account(s) to the one or more archival files. According to various embodiments, each regulated user account may be associated with the same external organization—but may correspond to a different compliance policy from that same external organization. For each regulated user account, the Archiving Engine generates a translated file(s) from the archival files in data storage 306 in accordance with archival data requirements identified in a compliance policy for the respective regulated user account. The Archiving Engine further transfers the translates file to an external storage location and generates a link for accessing the translated file at the external storage location for an API and web hook. The external storage location may be a cloud-base storage location of an organization of the regulated user account or may be a cloud-based storage location accessible to a 3$^{rd}$ party vendor managing a data archiving service on behalf of the regulated user account's organization. In addition, the Archiving Engine generates metadata for the translated file.

According to some embodiments, the meeting archiving agent 302 may detect that a regulated user account that is attempting to join a virtual meeting (or has already joined a virtual meeting) is associated with certain types of virtual meeting data that is required to be archived according to a compliance policy associated with that regulated user account. However, the meeting archiving agent 302 may further detect that a communication channel of the virtual meeting that produces the type of virtual meeting data required to be archived is unavailable.

Based on the unavailability of the particular communication channel, the meeting archiving agent 302 disables the virtual meeting or sends a notification to a module(s) in the platform 140 requesting that the virtual meeting the disabled. For example, the meeting archiving agent 302 may detect that the particular communication channel has become unavailable while the virtual meeting is already in progress. Upon detecting the communication channel unavailability, the meeting archiving agent 302 may terminate the virtual meeting, may block the regulated user account's connection to the virtual meeting, or send a request to the platform 140 to block the regulated user account access to the virtual meeting.

According to some embodiments, the meeting archiving agent 302 may detect that the particular communication channel is already unavailable prior to a start time of the virtual meeting. Upon detecting the communication channel unavailability prior to the virtual meeting, the meeting archiving agent 302 may cancel the virtual meeting such that it cannot be accessed by any user account that has been invited to join the virtual meeting. In other embodiments, the meeting archiving agent may cancel the invitation sent to the regulated user account or may send a request to the platform 140 cancel the invitation sent to the regulated user account.

Figure 5:
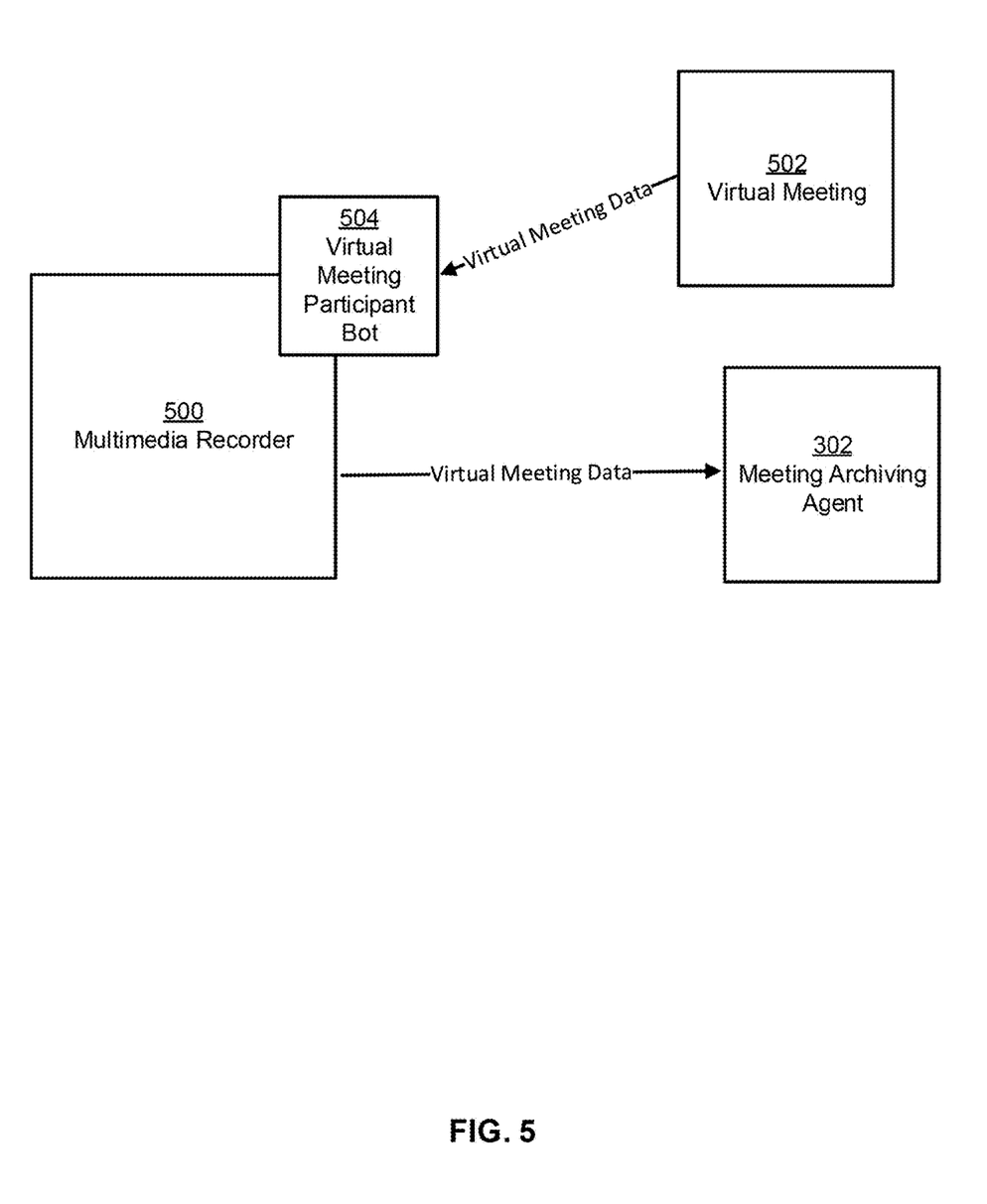
FIG. 5 is a diagram illustrating an exemplary environment in which some embodiments may operate.

As shown in FIG. 5, a multimedia recorder 500 sends encrypted regulated user data to the meeting archiving agent 302 to be placed in storage. According to some embodiments, a virtual meeting 502 may be hosted on the platform 140 and be joined by a plurality of user accounts. Multiple user accounts may be regulated user accounts. The multimedia recorder 500 initiates capture of all communication channels of the virtual meeting 502 upon detection of the first regulated user account to join the virtual meeting 502. For example, if no regulated user account has joined the virtual meeting 502 at the actual start time of the virtual meeting 502, the multimedia recorder 500 will not capture any communication channels of the virtual meeting 502 until a regulated user account actually joins the virtual meeting 502.

Upon detecting the virtual meeting 502 is currently joined by one regulated user account, the multimedia recorder 500 instantiates a bot program 504 that acts as an invisible virtual meeting participant that joins the call. The multimedia recorder 500 captures virtual meeting data from the communication channels of the virtual meeting 502 being sent to the invisible bot program 504. The multimedia recorder 500 encrypts and forwards the captured virtual meeting data to the meeting archiving agent 302.

According to various embodiments, as subsequent regulated user accounts join the virtual meeting 502 after the multimedia recorder 500 has already instantiated the bot program 504 and to begin capturing the communication channels of the virtual meeting 502, the bot program 504 continues to capture the communication channels. Stated differently, the multimedia recorder 500 does not instantiate a new bot program for each subsequently joining regulated user account. However, as each regulated user account leaves the virtual meeting 502, the bot program 504 continues to capture the communication channels. In some embodiments, when the last regulated user account leaves the virtual meeting 502 prior to an actual end time of the virtual meeting 502, the bot program 504 continues to capture the communication channels even though no regulated user accounts have stayed in the virtual meeting 502. When the virtual meeting 502 ends, the multimedia recorder 500 terminates the bot program 504 terminates as well.

It is understood that the communication channels captured via bot program 504 may be any type of data shared amongst the user accounts that have joined the virtual meeting 502. As already described, the bot program 504 may record video data and chat data it receives in the virtual meeting 502. In some embodiments, a communication channel may be related to a collaborative functionality provided to the user accounts during the virtual meeting 502. For example, the collaborative functionality may be a whiteboard functionality in which multiple user accounts can provide inputs and edits in real-time to a whiteboard editing space displayed to each user account during the virtual meeting 502. Upon detecting that the virtual meeting 502 has ended, the bot program 504 may generate a document that represents a final editing state of the whiteboard editing space and the multimedia recorder 500 may send the document to the meeting archiving agent 302 for storage.

In other embodiments, the bot program 504 may generate multiple, different documents, where each document corresponds to a different editing state of the whiteboard editing space. For example, a first document may include an editing state resulting from a first set of respective edits and inputs to the whiteboard editing space selected by one or more of the user accounts in the virtual meeting 502. A second document may include an editing state resulting from a subsequent second set of edits and inputs applied to the whiteboard editing space after the first set of respective edits and inputs.

Figure 6:
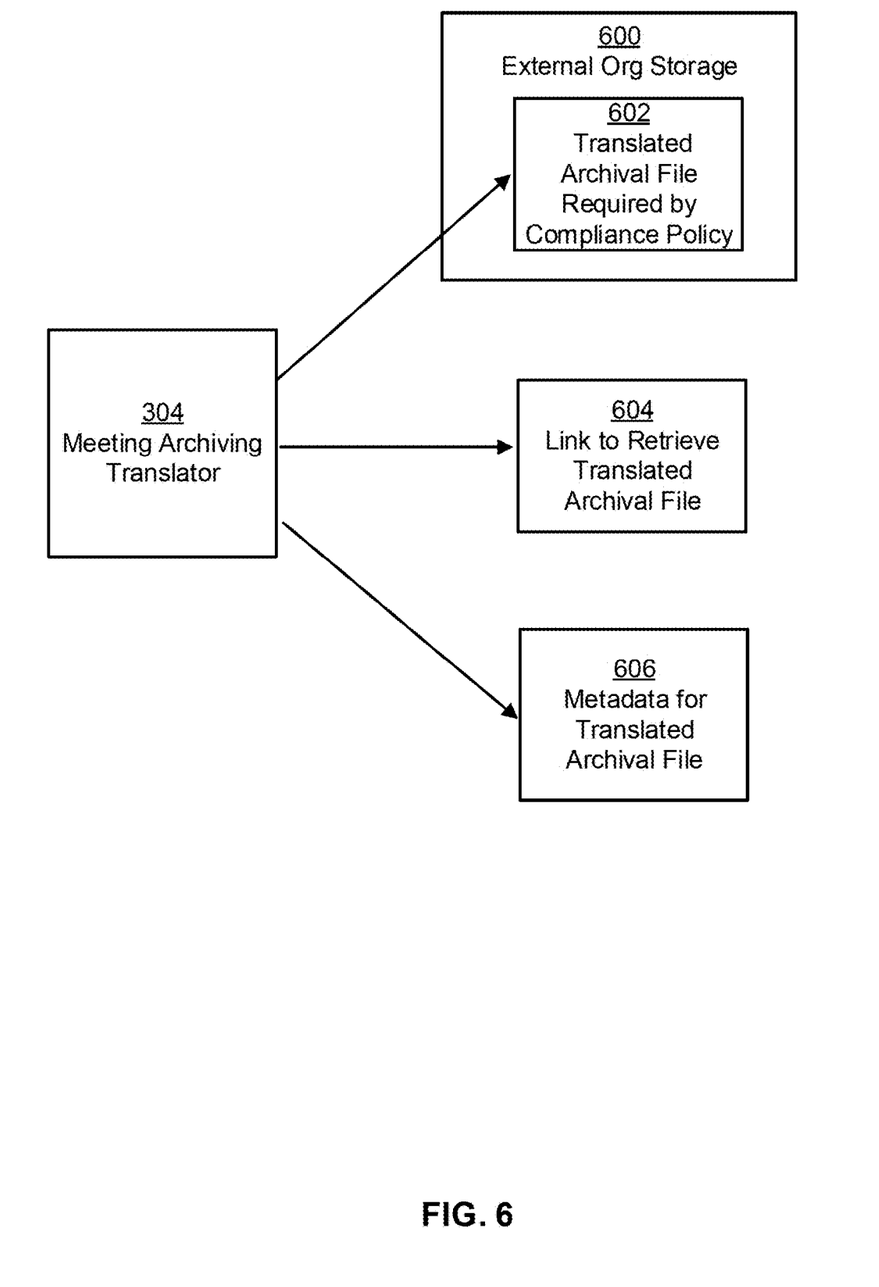
FIG. 6 is a diagram illustrating an exemplary environment in which some embodiments may operate.

As shown in FIG. 6, the meeting archiving translator 304 generates translated archived file(s) 602 according to a particular compliance policy, a link 604 to the translated archived file(s) 602 and metadata 606 for the translated archived file(s) 602. According to some embodiments, the meeting archiving translator 304 accesses a first compliance policy associated with a first regulated user account that joined the virtual meeting 502. The first compliance policy indicates the various types of virtual meeting data it requires to be archived for the first regulated user account. For example, a compliance policy may indicate that only chat data needs to be archived or it may indicate that video or voice data needs to be archived but not the chat data. It is understood that a compliance policy may further indicate that other types of data from a variety types of virtual meeting communication channels or to be archived.

Upon determining that the first compliance policy indicates video data is to be archived in relation to the first regulated user account, the meeting archiving translator 304 transfers the video data in the first archival file in data storage 306. The transferred video data is thereby a translated file 602. The meeting archiving translator 304 places the translated file 602 in a storage location 600 associated with an organization external to the platform 140. For example, the storage location 600 may be a cloud-based cluster location associated with the external organization or a vendor.

The meeting archiving translator 304 generates a link 604 that references the storage location 600 at which the translated file 602 is stored for access by the external organization (or vendor). In addition, the meeting archiving translator 304 generates metadata 606 for the translated archival file 602.

In some embodiments, a compliance policy may require only that voice data of a regulated user account be archived. A virtual meeting may be joined by a plurality of regulated user accounts from a same external organization. As such, a single compliance policy that requires archival of only voice data may correspond to multiple regulated user accounts—from the same external organization—participating in the virtual meeting. The Archiving Engine may access the raw communication channel data captured by the bot program that includes video data from the virtual meeting.

The Archiving Engine generates multiple different translated files on a per regulated user account basis where multiple regulated user accounts are governed according to the same (or different) compliance policy from a shared external organization. For example, a first translated file for a first regulated user account may only include voice data from the virtual meeting that occurs between the times that the first regulated user account joined and left the virtual meeting. A second translated file for a second regulated user account may only include voice data from the virtual meeting that occurs between the times that the second regulated user account joined and left the virtual meeting.

Figure 7:
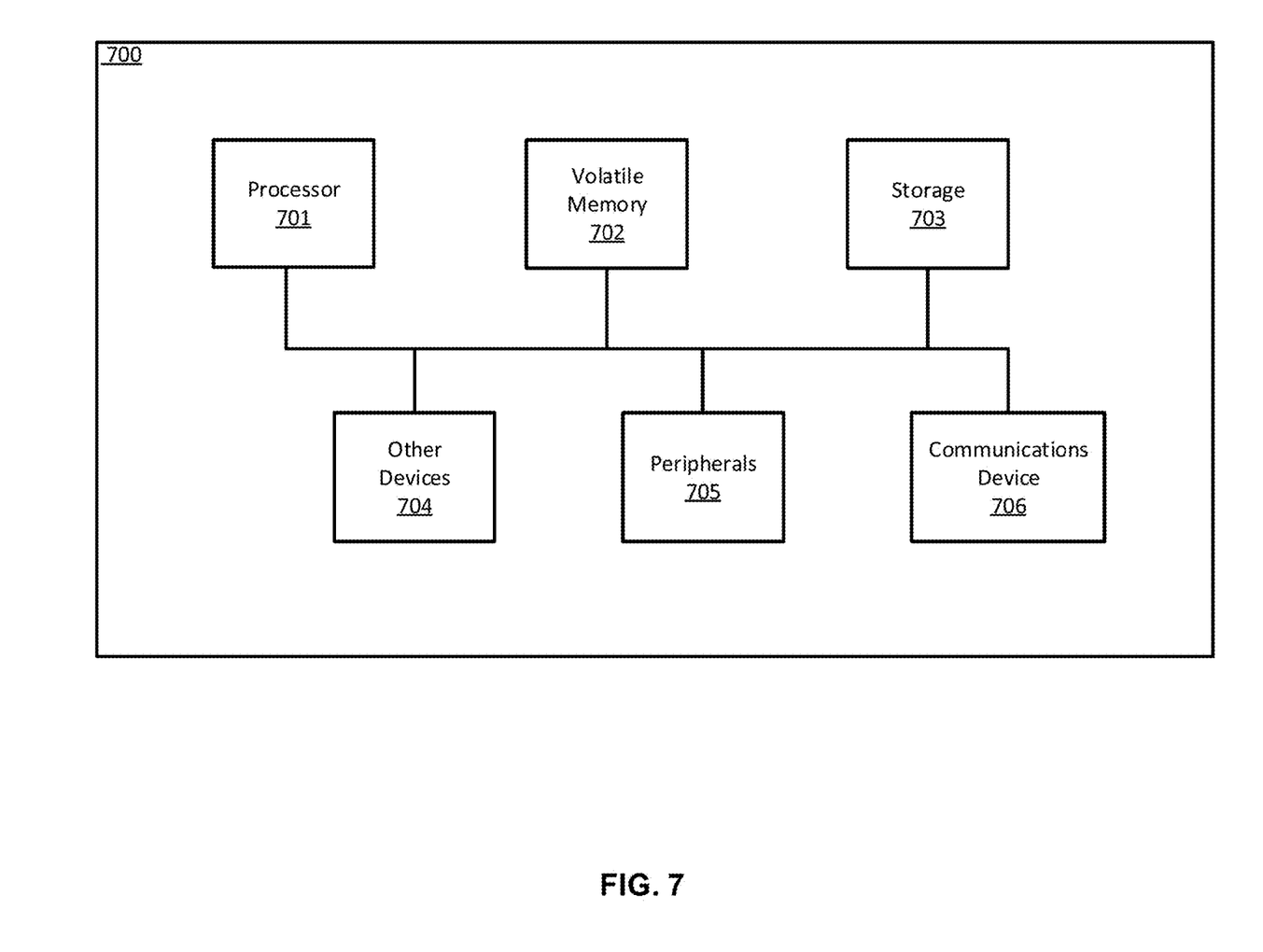
FIG. 7 is a diagram illustrating an exemplary environment in which some embodiments may operate.

FIG. 7 is a diagram illustrating an exemplary computer that may perform processing in some embodiments. Exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 7.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 700 to an external medium. For example, communications device 706 may take the form of a network adapter that provides communications to a network. A computer 700 may also include a variety of other devices 704. The various components of the computer 700 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computer device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A communication system comprising one or more processors configured to perform operations of:
   detecting one or more regulated user accounts joining a virtual meeting hosted within the communication system;
   instantiating a virtual meeting participant instance based on detection of a first regulated user account of the one or more regulated user accounts joining the virtual meeting by executing a bot program as a virtual meeting participant to join the virtual meeting;
   capturing, via the virtual meeting participant instance in the virtual meeting, communication channel data from one or more communication channels of the virtual meeting starting from an earliest entry time of the first regulated user account to join the virtual meeting;
   generating one or more archival files based on the communication channel data captured by the virtual meeting participant instance; and
   generating one or more translated files by applying a compliance policy associated with at least one of the regulated user accounts to the one or more archival files.

2. The communication system of claim 1, wherein instantiating the virtual meeting participant instance based on detection of the first regulated user account of the one or more regulated user accounts joining the virtual meeting comprises:
   instantiating the virtual meeting participant based on detecting the first regulated user account to join the virtual meeting before any other respective regulated user account joins the virtual meeting, wherein the virtual meeting bot participant that is invisible to all user accounts during the virtual meeting.

3. The communication system of claim 2, further comprising:
   detecting the first regulated user account joins the virtual meeting after a start time of the virtual meeting;
   wherein capturing, via the virtual meeting participant instance in the virtual meeting, communication channel data from one or more communication channels of the virtual meeting starting from an earliest entry time of the first regulated user account to join the virtual meeting comprises:
      capturing the communication channel data from the one or more communication channels starting from an entry time, after the start time of the virtual meeting, at which the first regulated user account joins the virtual meeting; and
      completing capture of the communication channel data from the one or more communication channels when the virtual meeting ends.

4. The communication system of claim 3, wherein completing capture of the communication channel data from the one or more communication channels when the virtual meeting ends comprises:
   completing capture of the communication channel data from the one or more communication channels when the virtual meeting ends, wherein the virtual meeting ends after each of the one or more regulated user accounts have left the virtual meeting prior to an end time of the virtual meeting.

5. The communication system of claim 2, wherein capturing communication channel data from one or more communication channels of the virtual meeting comprises:
   capturing a video stream of the virtual meeting;
   capturing an audio stream of the virtual meeting; and
   capturing, separately from the video stream, chat message data of the virtual meeting.

6. The communication system of claim 5, further comprising:
   capturing, separately from the video stream, the audio stream and the chat message data, a document that represents data from a collaborative editing space presented during the virtual meeting; and
   wherein generating one or more archival files based on the communication channel data captured by the virtual meeting participant instance comprises:
      generating at least one of: a first archival file based on the video stream, a second archival file based on the chat message data, a third archival file based on the document, a fourth archival file based on the audio stream and a fifth archival file based on a transcription of the virtual meeting.

7. The communication system of claim 1, wherein generating one or more translated files by applying a compliance policy associated with at least one of the regulated user accounts to the one or more archival files comprises:
   transferring the one or more translated files to an external storage location;
   generating metadata that corresponds to the one or more translated files; and
   triggering an application programming interface (API) or a web hook based on a subscription for notification of translated file events for the compliance policy.

8. The communication system of claim 1, wherein capturing, via the virtual meeting participant instance in the virtual meeting, communication channel data from one or more communication channels of the virtual meeting starting from an earliest entry time of the first regulated user account to join the virtual meeting comprises:
   determining that a particular communication channel is unavailable for the virtual meeting;
   determining the unavailable communication channel corresponds to a type of compliance event listed in the compliance policy for content to be retained; and
   disabling the virtual meeting due to unavailability of communication channel.

9. The communication system of claim 8,
   wherein the unavailable communication channel comprises unavailable virtual meeting video;
   wherein disabling the virtual meeting comprises:
      disabling instantiation of the virtual meeting when the first regulated user account is a host of the virtual meeting, comprising a user account associated with the compliance policy that lists video compliance events.

10. The communication system of claim 9,
wherein disabling the virtual meeting comprises:
terminating the virtual meeting while it is in progress when the virtual meeting video becomes unavailable, wherein the first regulated user account associated with the compliance policy that lists video compliance events is present in the virtual meeting prior to the virtual video meeting becoming unavailable.

11. A computer implemented method comprising:
detecting one or more regulated user accounts joining a virtual meeting hosted within a communication system;
instantiating a virtual meeting participant instance based on detection of a first regulated user account of the one or more regulated user accounts joining the virtual meeting by executing a bot program as a virtual meeting participant to join the virtual meeting;
capturing, via the virtual meeting participant instance in the virtual meeting, communication channel data from one or more communication channels of the virtual meeting starting from an earliest entry time of the first regulated user account to join the virtual meeting;
generating one or more archival files based on the communication channel data captured by the virtual meeting participant instance; and
generating one or more translated files by applying a compliance policy associated with at least one of the regulated user accounts to the one or more archival files.

12. The computer implemented method of claim 11, wherein instantiating the virtual meeting participant instance based on detection of the first regulated user account of the one or more regulated user accounts joining the virtual meeting comprises:
instantiating the virtual meeting participant based on detecting the first regulated user account to join the virtual meeting before any other respective regulated user account joins the virtual meeting, wherein the virtual meeting bot participant that is invisible to all user accounts during the virtual meeting: wherein the first regulated user account joins the virtual meeting after a start time of the virtual meeting;
wherein capturing, via the virtual meeting participant instance in the virtual meeting, communication channel data from one or more communication channels of the virtual meeting starting from an earliest entry time of the first regulated user account to join the virtual meeting comprises:
capturing the communication channel data from the one or more communication channels starting from an entry time, after the start time of the virtual meeting, at which the first regulated user account joins the virtual meeting; and
completing capture of the communication channel data from the one or more communication channels when the virtual meeting ends, wherein the virtual meeting ends after each of the one or more regulated user accounts have left the virtual meeting prior to an end time of the virtual meeting.

13. The computer implemented method of claim 12, wherein capturing communication channel data from one or more communication channels of the virtual meeting comprises:
capturing a video stream of the virtual meeting;
capturing, separately from the video stream, chat message data of the virtual meeting; and
capturing, separately from the video stream and the chat message data, a document that represents data from a collaborative editing space presented during the virtual meeting;
wherein generating one or more archival files based on the communication channel data captured by the virtual meeting participant instance comprises:
generating a first archival file based on the video stream;
generating a second archival file based on the chat message data; and
generating a third archival file based on the document.

14. The computer implemented method of claim 11, wherein capturing, via the virtual meeting participant instance in the virtual meeting, communication channel data from one or more communication channels of the virtual meeting starting from an earliest entry time of the first regulated user account to join the virtual meeting comprises:
determining that a particular communication channel is unavailable for the virtual meeting;
determining the unavailable communication channel corresponds to a type of compliance event listed in the compliance policy for content to be retained; and
disabling the virtual meeting due to unavailability of communication channel.

15. The computer implemented method of claim 14,
wherein the unavailable communication channel comprises unavailable virtual meeting video;
wherein disabling the virtual meeting comprises one of:
(i) disabling instantiation of the virtual meeting when the first regulated user account is a host of the virtual meeting, comprising a user account associated with the compliance policy that lists video compliance events; and
(ii) terminating the virtual meeting while it is in progress when the virtual meeting video becomes unavailable, wherein the first regulated user account associated with the compliance policy that lists video compliance events is present in the virtual meeting prior to the virtual video meeting becoming unavailable.

16. A computer program product comprising a non-transitory computer-readable medium having a computer-readable program code embodied therein to be executed by one or more processors, the computer-readable program code including instructions for:
detecting one or more regulated user accounts joining a virtual meeting hosted within a communication system;
instantiating a virtual meeting participant instance based on detection of a first regulated user account of the one or more regulated user accounts joining the virtual meeting by executing a bot program as a virtual meeting participant to join the virtual meeting;
capturing, via the virtual meeting participant instance in the virtual meeting, communication channel data from one or more communication channels of the virtual meeting starting from an earliest entry time of the first regulated user account to join the virtual meeting;
generating one or more archival files based on the communication channel data captured by the virtual meeting participant instance; and
generating one or more translated files by applying a compliance policy associated with at least one of the regulated user accounts to the one or more archival files.

17. The computer program product of claim 16, wherein instantiating the virtual meeting participant instance based on detection of the first regulated user account of the one or more regulated user accounts joining the virtual meeting comprises:

instantiating the virtual meeting participant based on detecting the first regulated user account to join the virtual meeting before any other respective regulated user account joins the virtual meeting, wherein the virtual meeting participant comprises a virtual meeting bot participant that is invisible to all user accounts during the virtual meeting;

wherein the first regulated user account joins the virtual meeting after a start time of the virtual meeting;

wherein capturing, via the virtual meeting participant instance in the virtual meeting, communication channel data from one or more communication channels of the virtual meeting starting from an earliest entry time of the first regulated user account to join the virtual meeting comprises:

capturing the communication channel data from the one or more communication channels starting from an entry time, after the start time of the virtual meeting, at which the first regulated user account joins the virtual meeting; and completing capture of the communication channel data from the one or more communication channels when the virtual meeting ends, wherein the virtual meeting ends after each of the one or more regulated user accounts have left the virtual meeting prior to an end time of the virtual meeting.

18. The computer program product of claim 16, wherein capturing, via the virtual meeting participant instance in the virtual meeting, communication channel data from one or more communication channels of the virtual meeting starting from an earliest entry time of the first regulated user account to join the virtual meeting comprises:

determining that a particular communication channel is unavailable for the virtual meeting;

determining the unavailable communication channel corresponds to a type of compliance event listed in the compliance policy for content to be retained; and disabling the virtual meeting due to unavailability of communication channel;

wherein the unavailable communication channel comprises an unavailable virtual meeting video;

wherein disabling the virtual meeting further comprises one of:

(i) disabling instantiation of the virtual meeting when the first regulated user account is a host of the virtual meeting, comprising a user account associated with the compliance policy that lists video compliance events; and     (ii) terminating the virtual meeting while it is in progress when the virtual meeting video becomes unavailable, wherein the first regulated user account associated with the compliance policy that lists video compliance events is present in the virtual meeting prior to the virtual video meeting becoming unavailable.

19. The computer program product of claim 16, wherein capturing communication channel data from one or more communication channels of the virtual meeting comprises: capturing the communication channel data from the one or more communication channels starting from an entry time, after a start time of the virtual meeting, at which the first regulated user account joins the virtual meeting, wherein capturing further comprises:

capturing a video stream of the virtual meeting, chat message data of the virtual meeting and a document that represents data from a collaborative editing space presented during the virtual meeting; and completing capture of the communication channel data from the one or more communication channels when the virtual meeting ends after each of the one or more regulated user accounts have left the virtual meeting prior to an end time of the virtual meeting; and wherein generating one or more archival files comprises: generating a first archival file based on the video stream, a second archival file based on the chat message data, and a third archival file based on the document.

\* \* \* \* \*